(12) United States Patent
Baird

(10) Patent No.: US 6,418,110 B1
(45) Date of Patent: Jul. 9, 2002

(54) OPTICAL DISK PICKUP SYSTEM USING CURRENT DIVISION SIGNAL TRANSMISSION AND METHODS AND OPTICAL DISK SYSTEMS USING THE SAME

(75) Inventor: Rex Baird, Austin, TX (US)

(73) Assignee: Cirrus Logic Inc.

( * ) Notice: Subject to any disclaimer, the term of this patent is extended or adjusted under 35 U.S.C. 154(b) by 0 days.

(21) Appl. No.: 09/703,315

(22) Filed: Oct. 31, 2000

(51) Int. Cl.[7] ................................................ G11B 7/00
(52) U.S. Cl. .......................... 369/124.1; 369/124.12; 369/44.41
(58) Field of Search ..................... 369/44.11, 44.14, 369/44.28, 44.34, 44.41, 47.1, 53.1, 59.1, 124.01, 124.04, 124.05, 124.07, 124.1, 124.12, 124.15

(56) References Cited

U.S. PATENT DOCUMENTS 4,998,234 A * 3/1991 Rees et al. ............. 369/124.05
5,740,141 A * 4/1998 Sano et al. ............. 369/124.05

* cited by examiner

*Primary Examiner*—Muhammad Edun
(74) *Attorney, Agent, or Firm*—James J. Murphy, Esq.; Winstead Sechrest & Minick

(57) ABSTRACT

An optical disk pickup system 400 using current mode signal transmission is disclosed. An operational amplifier 404 has an input for receiving an electrical signal and a feedback loop including a current path of a first transistor 405 of a first size, transistor 405 having a control terminal at a preselected voltage. A conductor 402 is coupled to an output of operational amplifier 404 for transmitting the electrical signal as a current. A second transistor 406 of a second size has a current path in series with a conductor 402 and a control terminal coupled to the preselected voltage, transistors 405, 406 forming a current divider.

20 Claims, 3 Drawing Sheets

OPTICAL DISK PICKUP SYSTEM USING CURRENT DIVISION SIGNAL TRANSMISSION AND METHODS AND OPTICAL DISK SYSTEMS USING THE SAME

CROSS-REFERENCE TO RELATED APPLICATION

The following co-pending and co-assigned applications contain related information and are hereby incorporated by reference:

Ser. No. 08/956,569, entitled "SYSTEMS AND METHOD FOR CONTROL OF LOW FREQUENCY INPUT LEVELS TO AN AMPLIFIER AND COMPENSATION OF INPUT OFFSETS OF THE AMPLIFIER" filed Oct. 23, 1997;

Ser. No. 09/702,240, entitled AN OPTICAL DISK PICKUP USING CURRENT MODE SIGNAL EXCHANGES AND SYSTEMS AND METHODS USING THE SAME", filed Oct. 30, 2000;

Ser. No. 09/282,121, entitled "CIRCUITS AND METHODS FOR EXCHANGING SIGNALS IN OPTICAL DISK SYSTEMS AND SYSTEMS USING THE SAME", filed Mar. 31, 1999, currently pending;

Ser. No. 09/282,840, entitled "CIRCUITS AND METHODS FOR GAIN RANGING IN AN ANALOG MODULATOR AND SYSTEMS USING THE SAME", filed Mar. 31, 1999, currently pending;

Ser. No. 09/282,841, entitled "A FLEXIBLE INTERFACE SIGNAL FOR USE IN AN OPTICAL DISK SYSTEMS AND SYSTEM AND METHODS USING THE SAME", filed Mar. 31, 1999, currently pending; and Ser. No. 09/282,849, entitled "SERVO CONTROL LOOPS UTILIZING DELTA-SIGMA ANALOG TO DIGITAL CONVERTERS AND SYSTEMS AND METHODS USING THE SAME" filed Mar. 31, 1999, currently pending.

BACKGROUND OF THE INVENTION

1. Field of the Invention

The present invention relates in general to optical disk pickup systems and in particular to optical disk pickup systems using current division signal transmission and methods and optical disk systems using the same.

2. Description of the Related Art

Optical disks have been used for many years for the mass storage of digital data. Some well known examples of optical disks include digital audio compact disks (CD-DAs), compact disk read-only memories (CD-ROMs) and digital video disks (DVD-RAMs, -ROM,+RW, -RW, CD-R, CD-RWs). Essentially, digital data is stored on a plastic disk with a reflective surface as a series of pits and land in the reflective surface. During playback, a beam of light is directed to the rotating reflective surface and the intensity of the photons reflected from the pits and land measured. A modulated electrical signal is generated that can be processed and the data stored on the disk recovered.

A basic configuration for the read (playback) mechanism has developed over a number of years. This configuration includes a pickup or sled which is movable so that a laser, a lens, and array of photodiodes can be positioned directly over the data being read off of the disk. As the disk turns, the photons from the laser are reflected off the pits and land and received by the photodiodes which generate electrical signals having a current that is proportional to photon density.

The multiple signals output from the photodiodes represent both data detection and servo alignment information. The summation of the high speed data channel signal, which may be composed of the signals A+B+C+D from an astigmatic photodiode array, results in a composite signal with relevant information between approximately 10 KHz and 60 MHz for current DVD players. Servo information contained in these signals however, is at frequencies less than 1 MHz down to dc (for current spindle rotation rates of <6000 RPM). Because of these information rates, the data channel signal is sometimes AC-coupled to the data detection and summation circuitry mounted on an accompanying stationary circuit board. Otherwise, some degradation of the dynamic range must be accepted due to the dc content of the incoming signal.

The typical current signal generated by a photodiode is on the order of 1 uA. Transferring this signal directly down a flexible cable to the stationary circuit board therefore would seriously degrade the signal to noise ratio. Hence, transimpedance amplifiers, which convert the current from the photodiode array into a voltage for driving the cable, are mounted in the pickup to minimize noise and interference effects. The data detection, error correction, and servo systems are kept off of the pickup not only because of interference reasons, but primarily to reduce the physical size and mass of the sled. These systems are mostly digital, and switching noise on the pickup may degrade the signal to noise ratio.

One of the primary concerns about transferring data across the flexible cable as a voltage is maintaining a good signal to noise ratio. A good signal to noise ratio can be achieved by insuring that the output of the pickup electronics are driven across the flexible cable using a sufficiently high supply voltage. Notwithstanding, it would be desirable to be able to reduce the supply voltage to save power; however, to do so would reduce the amplitude of the signals being transmitted across the cable and hence reduce the signal to noise ratio. Moreover, a reduced voltage supply rail decreases signal dynamic range. What is needed therefore are methods and circuitry which maintain the signal to noise ratio for signals being transmitted across the flexible cable, even if the supply voltage is reduced.

SUMMARY OF THE INVENTION

An optical disk pickup system is disclosed using current mode signal transmission. An operational amplifier has an input for receiving an electrical signal and a feedback loop including a current path of a first transistor of a first size, the first transistor having a control terminal at a preselected voltage. A conductor is coupled to an output of the operational amplifier for transmitting the electrical signal as a current. A second transistor of a second size has a current path in series with the conductor and a control terminal coupled to the preselected voltage, the first and second transistors forming a current divider.

The use of current mode data exchanges has substantial advantages over the traditional voltage mode transmission schemes. Among other things, by using current, the supply voltage used to transmit and receive signals can be substantially reduced without a significant degradation in signal to noise ratio. Moreover, when signals are summed for transmission, current mode transmission ensures that the available voltage headroom is used efficiently.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIGS. 1–4 of the drawings, in which like numbers designate like parts.

Figure 1:
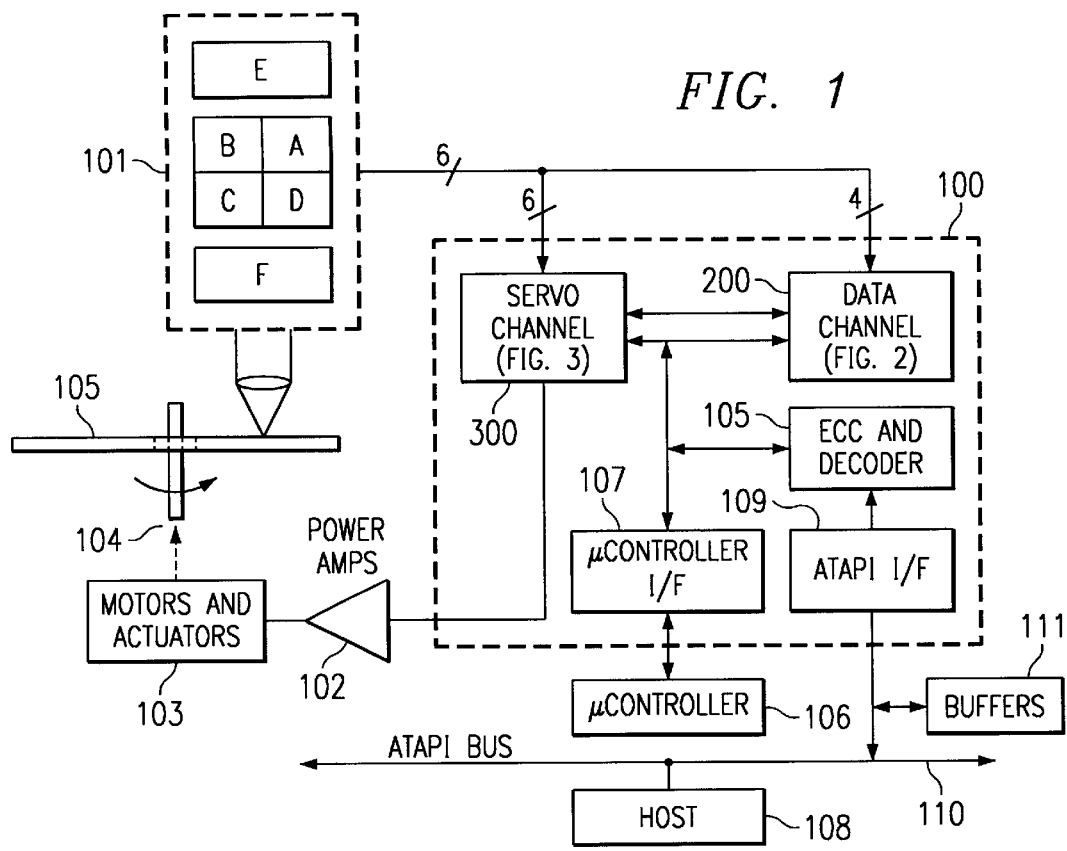
FIG. 1 is a conceptual diagram of an exemplary personal computer based optical disk playback system.

FIG. 1 is a conceptual diagram of an exemplary personal computer (PC) based optical disk playback system including a drive manager integrated circuit (IC or "chip") 100 embodying the present inventive concepts. It should be recognized however that IC 100 can also be used with CD or DVD players and DVD RAM systems. In addition to chip 100, the system also includes optical pickup 101, including the requisite laser, photodiode array and transimpedance amplifiers, and the power amplifiers 102 and motors & actuators 103 which control the player spindle 104 rotation and pickup 101 movement and alignment. In the preferred embodiment, drive manager chip 100 embodies decoding circuitry for processing data from either DVD-ROM, CD-ROM or CD-DA optical disks.

There are two principal processing paths, one each for the servo and data channels, the inputs of which are driven by the transimpedance amplifiers on optical pickup 101. The servo path is shown generally at 300 and the data path generally at 200. Each of these paths will be discussed in further detail below in conjunction with FIGS. 3 and 2 respectively. The output of the data channel is passed through ECC and Decoder 105 for additional processing such as error correction and content descrambling.

Local control is implemented by microcontroller 106 through microcontroller interface 107. Typically, local microcontroller 106 is user supplied for maximum flexibility and generally provides the instructions directing the on-board processors and error correction circuitry.

Chip 100 additionally communicates with a host processor 108 via an ATAPI bus interface 109 and ATAPI bus 110, in the case of a PC-based system. The host performs the actual processing of the audio/video information or data retrieved from the disk after error correction and buffering by chip 100. Among other things, the host performs audio and video MPEG decoding and generates the corresponding user interface. Buffers (DRAM) 111 support error correction functions and the streaming of data from chip 100 to host 108.

Figure 2:
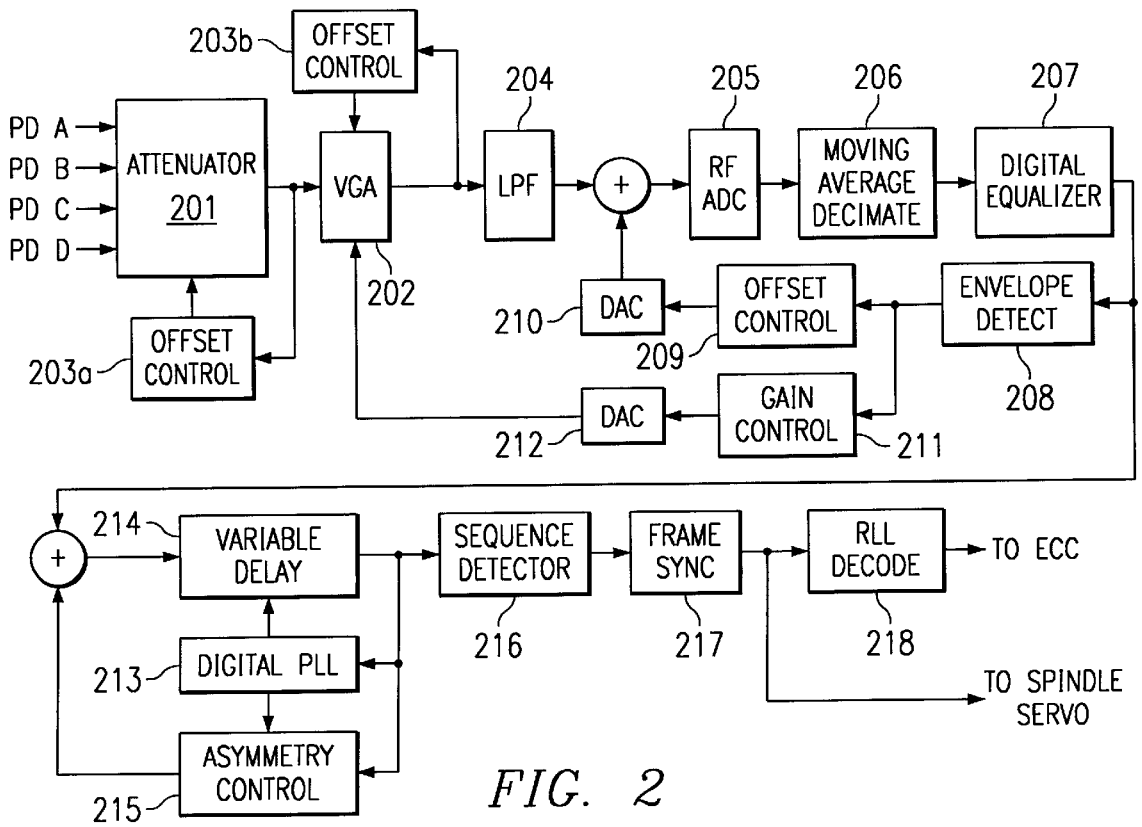
FIG. 2 is a detailed functional block diagram of the data path shown in FIG. 1.

Referring to FIG. 2 which is a detailed functional block diagram of data path 200, attenuators 201 are used in the preferred embodiment to protect the inputs to following VGAs from damage from any over-voltages produced by the pickup. Offset controls 203a and 203b allow the digital offset control loop discussed below to respond to dc and low frequency baseline offsets in attenuators 201 and VGAs 202.

Data channel summation and variable gain amplifier (VGA) circuitry 202 add one or more signals from the transimpedance amplifiers on pickup 101 to form a composite data signal (e.g., A+B+C+D). Alternatively, the signal addition may be done right on pickup 101, either electrically or optically. The VGA gain is controlled by automatic gain control loops, also discussed below.

A low pass filter (LPF) 204 provides anti-aliasing for flash analog to digital converter 205. A digital moving average of the output of ADC 205 is taken and filter 206 applied to reject noise and interference in the Nyquist bandwidth, as well as perform a decimation. It should be noted that any one of a number of other types of filters can be used to achieve the same result. The decimating filter 206 can also be used to lower the effective sampling rate of the data for subsequent digital data processing. The data is then digitally equalized using a multiple-tap fmite impulse response (FIR) filter 207 adjustable to differing data rates and disk resolutions. Advantageously, the front-end analog circuits are simplified since data is immediately digitized and the necessary equalization is performed digitally.

Automatic offset control is effectuated by the loop including envelope detectors 208, offset control 209 and DAC 210. Envelope detector 208 detect both the top and bottom envelopes of the high speed data signal. These envelopes are summed to produce an error signal which is passed through an offset loop compensation filter within offset control block 209 and integrated. The output of the loop compensation filter is converted to analog form by DAC 210 and summed with the output of LPF 204.

Gain control loop 211 also takes the difference between the amplitudes of top and bottom detected envelopes and subtracts a pre-programmed gain value. A gain loop compensation filter integrates the results and produces a linearized signal which is converted by DAC 212 to analog form and passed to VGAs 202 to adjust the signal gain.

An interpolating digital phased-locked loop (DPLL) 213 retimes the data after ADC sampling and digital equalization. DPLL 213 operates on sampled amplitudes and generally includes a digital phase error detector, digital loop compensation filter, and digital frequency to phase integrator (digital VCO). Variable delay filter 214 interpolates the asynchronous digital samples to ideal synchronously sampled samples at the front of the DPLL. The phase detector then generates an error signal using a stochastic process which compares the incoming data with ideal target sampling values without noise. The error signal is multiplied by the derivative of the target data to produce phase error estimates. The loop compensation filter performs a proportional integration and the result is sent to variable delay filter 214 to adjust the delay and correct for phase errors.

Advantageously, digital PLL 213 allows the ADC and equalizer to operate at a fixed asynchronous sample rate to the data.

Asymmetry control circuitry 215 includes a control loop which corrects the read errors from the optical pickup. The errors are detected using either the slicer duty cycle or zero crossing errors. The errors are then scaled and integrated by a compensation filter and the resulting compensation signal summed at the input to variable delay filter 214.

The retimed data is then processed by a maximum likelihood sequence detector 216. The partial response equalization target assumed in this detector is $G(D)=1+D+D^2+D^3$. Other targets also may be used in alternate embodiments. The output of sequencer 216 is synchronized by frame synchronization circuitry 217 and then passed to Run Length Limit ("RLL") decoder 218. RLL code embedded in the disk is used as an indication of disk defects. Generally, a state machine checks for violation of the RLL code "k-constraint" and failures in synchronization and causes the data channel to freeze and "coast" through the defect. It resynchronizes to the data stream when data transitions are again detected.

Automatic Zone Control (AZC) logic (not shown) takes advantage of the digital nature of the data channel by initializing subsystems based on data rate. For example, the tap weights and tap spacing of the digital equalizer are set to correspond to one of six incoming data rates. Similarly, the loop coefficients, and hence the loop dynamics, of interpolating digital PLL 213 are controlled by the AZC logic.

In sum, the data channel is a bandpass system with signals in the 10 kHz to 60 MHz range. The signal spectrum below 10 kHz is either servo information or external dc offsets from the pickup electronics. The presence of this information reduces the dynamic range and bandwidth of the data channel. Using an off-chip ac coupling capacitor would reduce the dc offset but blocks the low frequency servo information. Instead, the dc signal is brought on-chip and a control loop performs the effective ac coupling for the data channel. Not only are external coupling capacitors unnecessary, but defect detection by the downstream digital processing can freeze this control loop when a defect is reached, unlike an ac coupled system where the baseline wanders. The offset and AGC loops are also frozen until data transitions are detected.

Co-pending and co-assigned application Ser. No. 08/956,567, entitled "SYSTEM AND METHOD FOR CONTROL OF LOW FREQUENCY INPUT LEVELS TO AN AMPLIFIER AND COMPENSATION OF INPUT OFFSETS OF THE AMPLIFIER" filed Oct. 23, 1997 contains related information and is hereby incorporated by reference.

Decoder block 105 (FIG. 1) manages the flow of data between the data channel and external DRAM buffer 111 and manages PC host ATAPI interface 109. The ECC circuitry performs realtime ECC correction for DVD data and layered ECC correction for CD-ROM data. Additionally 8–14 demodulation is provided for DVD data and EFM demodulation for error correction and deleaving of CD-DA and CD-ROM data. A burst cutting area (BCA) decoder is built-in chip 100 for DVD-ROM applications. DVD Navigation Play for DVD player operations is supported along with CSS circuitry for descrambling DVD data which has been scrambled under the Content Scramble System. The error correction and decoding functions are supported by on-chip SRAM.

Figure 3:
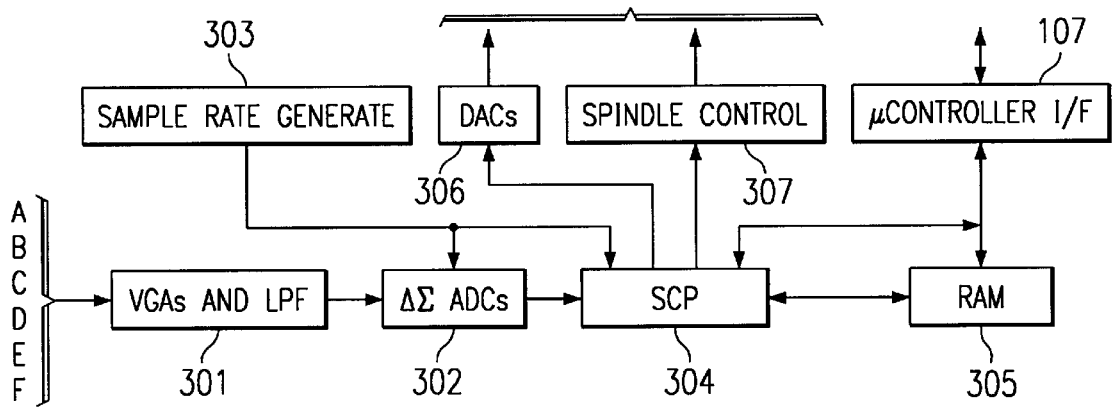
FIG. 3 is a diagram showing further detail of the servo control path shown in FIG. 1.

As indicated above, the second principal signal path of the chip 100 controls servo operation and is shown generally at 300 in FIG. 1 and in further detail in FIG. 3. The integrated servo system operates four control loops: focus, tracking, sled, and spindle, using an internal servo control processor requiring little external microcontroller intervention.

Servo data is received from each of the six photodiodes 101 and then amplified by six VGAs 301. As a result, the following ADCs 302 only require 60 dB of dynamic range, because servo VGAs 301 boost the input signal by as much as 28 dB. VGAs 301 also incorporate low pass filtering (LPF) for anti-aliasing. Preferably three pole filters are used with one pole in front of the VGAs and two poles after the VGAs.

Analog to digital conversion is done immediately after low pass filtering such that the analog/digital boundary is as close to the input as possible. An input sampling frequency of 24 MHz (generated on-chip by sample rate generator 303) and a third order delta-sigma modulator reduce digital filter group delay inside the servo loop.

Servo data processing is performed by on-board servo control processor (SCP) 304, which receives its instruction set from the user selected local microcontroller 106 through interface 107 and RAM 305.

Unlike CD systems, DVD servo systems use differential phase detection (DPD) between the photodiode signals D1,D2 (D1=A+C, D2=B+D) for track following and track counting. A digital adaptive dual arm correlator (ADAC) is implemented. This is superior to the conventional DPD methods based on a simple phase detector and analog filters.

Analog control signals are transmitted to power amplifiers 102 through DAC array 306 and spindle controls 307.

According to the principles of the present invention, signals are transmitted across the flexible cable in an optical disk system as a current rather than a voltage. The signal can then be recovered at the receiving end using a low impedance load. By using current, a good signal to noise ratio and dynamic range can be achieved. One embodiment of these principles is depicted in FIG. 4A.

Figure 4A:
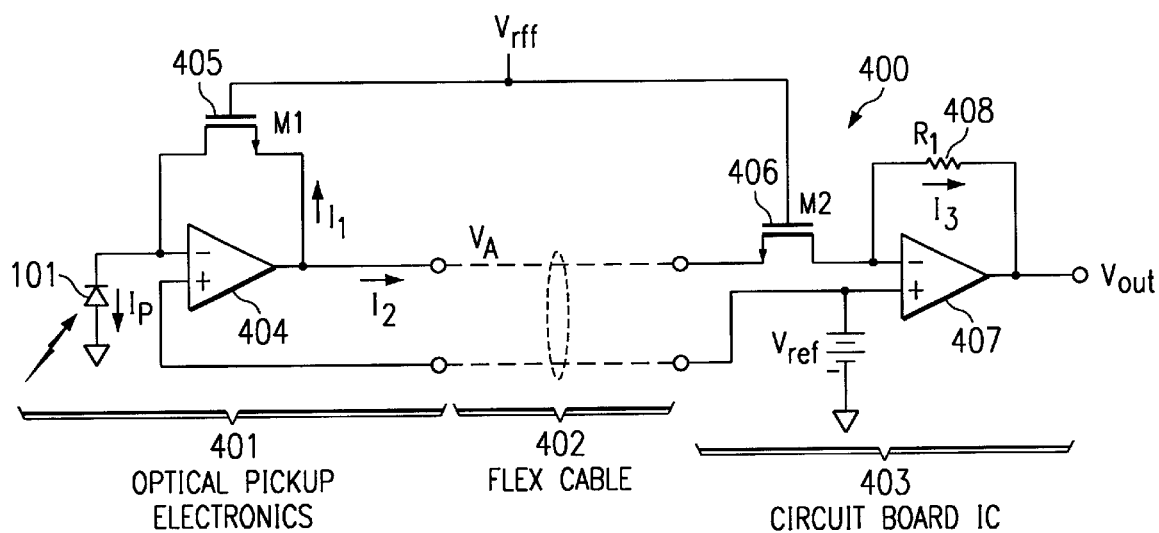
FIG. 4A is a diagram showing in detail a current mode signal transmission/reception system.

FIG. 4A is a more detailed functional block diagram of a current mode signal transmission/reception system 400 according to the inventive concepts. This circuitry is particularly advantageous for exchanging data, in either direction, between IC 100 and the electronics on the pickup. The three primary components are the photodiode 101, pickup electronics 401, flexible cable conductor 402, and circuitry 403 on IC 100.

Photodiode 101 converts photons returned from the disk and generates a current $I_p$, which is on the order of 1 to 10 uA. This signal is presented at the inverting input of an operational amplifier 404. The non-inverting input is coupled to a reference voltage $V_{REF}$. The current path of an n-channel field effect transistor (MOSFET) 405 is disposed in the the feedback loop between the operational amplifier output and the inverting input. The gate of transistor 405 is coupled to a gate-to-substrate voltage $V_{dd}$. For purposes of discussion, transistor 405 is assumed to have a channel width $W_1$ and a channel length $L_1$.

The output $V_A$ of operational amplifier 404 is transmitted across the corresponding conductor of flexible cable 402 as a differential signal referenced against $V_{REF}$. The signal $V_A$ is passed through the current path of a FET 406 to the inverting input of an operational amplifier 407. Transistor 406 is assumed to have a channel width of $W_2$ and a channel width $L_2$.

The gate of transistor 406 is also coupled to the common voltage $V_{dd}$ and the non-inverting input of operational amplifier 407 is coupled to $V_{REF}$. A resistor 408 is disposed in the feedback loop between the output and the inverting input of operational amplifier 407 and carries a current $I_3$.

Transmit/receive system 400 utilizes current division principles to drive a current across the flexible cable. Since FET 405 has a nonlinear resistance, the output voltage $V_A$ has a nonlinear variance with respect to the diode current $I_p$. However, the current division between $I_1$, the current through feedback transistor 405, and $I_2$, the current through transistor 406, itself is inherently linear, which allows the original signal to be recovered at the receiving end as a linearly varying voltage. It should be recognized that the use of transistors, rather resistors or similar elements, is the reduction of chip surface area afforded by transistors.

In this example, current $I_1=I_p$ and current $I_2=cI_1$. The scale factor (constant) c is based only on the scaling of FET 406 with respect to FET 405. Specifically:

$$I_2=[(W_2/L_2)/(W_1/L_1)]*I_p$$

Since the current $I_3=I_2$ the output voltage Vout has a linear variation with respect to $I_p$ because R has a linear resistance. Thus, the original signal is recovered as a linear voltage even though the transistor resistances are nonlinear. For a complete discussion of current division using MOS transistors, see Bult and Geelen, An Inherently Linear and Compact MOST-Only Current Division Technique, Proceeding of the IEEE Journal of Solid State Circuits Conference, Vol. 27, No. 12 (Dec. 1992).

One potential disadvantage to the circuit of FIG. 4A is that the transistors at the transmitting and receiving ends may be at different temperatures. This could cause an error in the current division ratio $I_1/I_2$. This drawback can be addressed by using a temperature sensor in the pickup electronics to correct for the variation between the transistors. One technique is described in Pietruszynski et al., "A 50 Mbits/s CMOS Monolithic Optical Receiver" IEEE Journal of Solid State Circuits, Vol. 23, No. 6. (Dec. 1988).

Figure 4B:
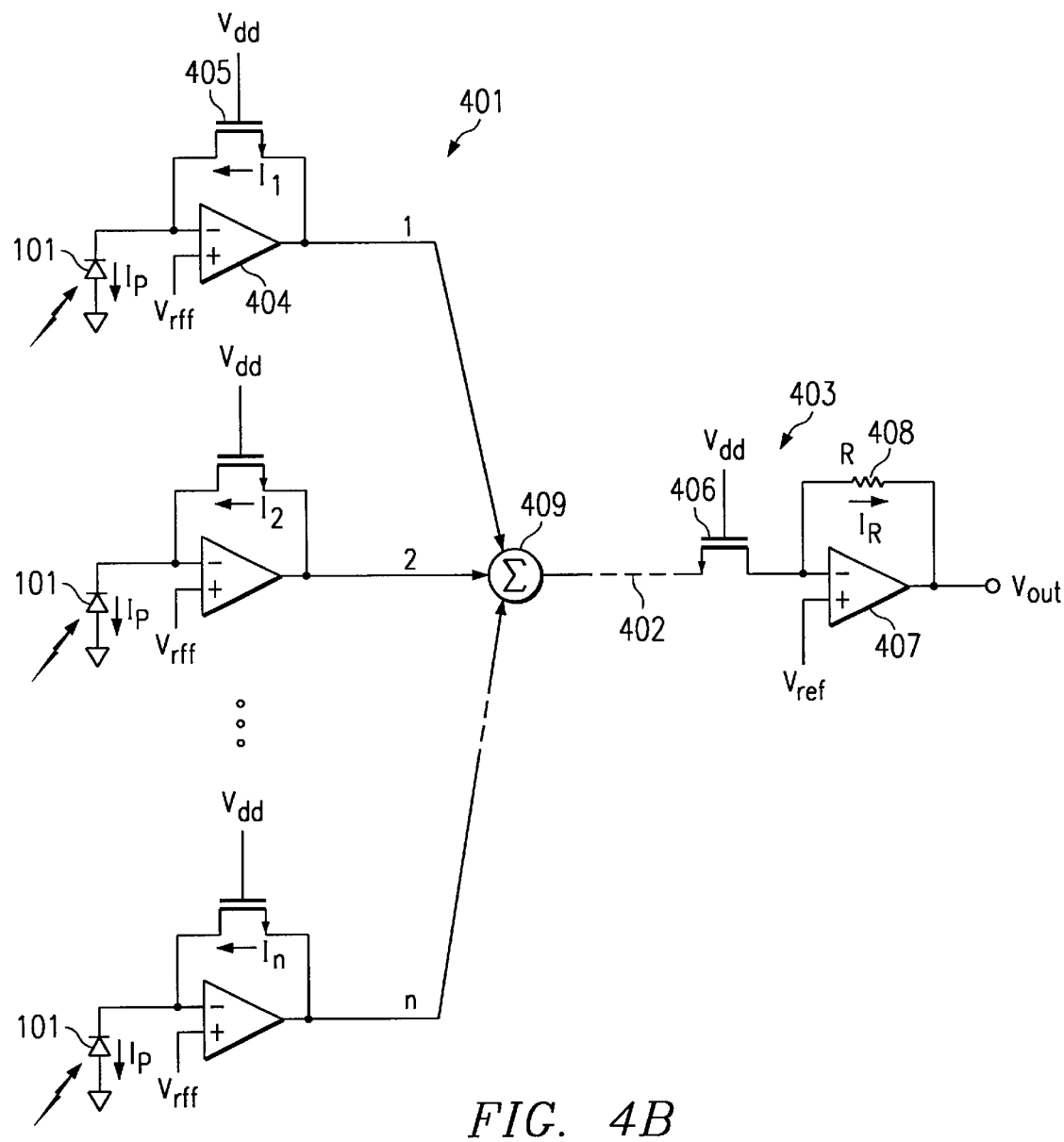
FIG. 4B is a diagram showing an alternate current mode signal transmission/reception system.

The present principles can be extended to embodiments where the signals representing a plurality of diodes are summed into a single signal for transmission between the pickup electronics and IC 100. This example is illustrated in FIG. 4B. In this case, the currents corresponding to selected diodes in array 101 are summed together by a summer 409.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. An optical disk pickup system using current mode signal transmission comprising:
    an operational amplifier having an input for receiving an electrical signal and a feedback loop including a current path of a first transistor of a first size, the transistor having a control terminal at a preselected voltage;
    a conductor coupled to an output of the operational amplifier for transmitting the electrical signal as a current; and
    a second transistor of a second size having a current path in series with the conductor and a control terminal coupled to the preselected voltage, the first and second transistors forming a current divider.

2. The optical disk system of claim 1 wherein the transistors comprise field effect transistors.

3. The optical system of claim 1 wherein the preselected voltage comprises a system supply voltage.

4. The optical system of claim 1 and further comprising a second operational amplifier having a input coupled to the second transistor and a linearly resistive feedback loop.

5. The optical system of claim 4 wherein the operational amplifiers each include a second input coupled to a common reference voltage.

6. An optical disk system comprising:
    an array of photodiodes for retrieving data from an optical disk and generating an electrical signal in response;
    optical pickup electronics for driving the electrical signal from the photodiodes across at least one selected conductor of a flexible cable including an amplifier circuit coupled to a selected one of the photodiodes and the selected conductor, the amplifier associated with a feedback loop having a resistive element feeding-back an output of the amplifier to an input of the amplifier; and
    fixed electronics including a second resistive element coupled in series between the selected conductor and an input of a second amplifier circuit, the second amplifier circuit including a feedback loop having a third resistive element, the first and second resistive elements forming a current divider for carrying the electrical signal across the selected conductor in a current mode.

7. The optical disk system of claim 6 wherein the first and second resistive elements comprise active elements.

8. The optical disk system of claim 6 wherein first and second resistive elements comprise nonlinear resistive elements.

9. The optical disk system of claim 6 wherein the first and second resistive elements comprise MOSFETs.

10. The optical disk system of claim 9 wherein a channel width to length ratio of each of the first and second MOSFETs are selected to form a current divider of a corresponding division ratio.

11. A method of transmitting signals as current in an optical disk system comprising the steps of:
    driving a signal received from a photodiode across a conductor with an amplifier circuit having a feedback loop comprising a first transistor of a first size; and
    receiving the signal through a second transistor of a second size coupled in series with the conductor, the second transistor forming a current divider with the first transistor.

12. The method of claim 11 and further comprising the step of converting the signal output from the second transistor from a current to a voltage.

13. The method of claim 12 wherein said step of converting comprises the step of converting the signal from a current to a voltage using a transimpedance amplifier having a linearly resistive feedback loop.

14. The method of claim 11 wherein the first and second transistors comprise field effect transistors having gates coupled to a common preselected voltage.

15. The method of claim 11 summing a current output from the amplifier with a current representing a second signal to produce a composite signal for transmission across the conductor.

16. An integrated circuit for use in an optical disk system comprising:
    an input port for receiving a signal representing information retrieved from an optical disk and transmitted on a conductor as a current; and
    a field effect transistor coupled in series with the input port, the transistor selectively sized to form a current divider with an external field effect transistor to drive the current across the conductor.

17. The integrated circuit of claim 16 wherein the input port comprises a servo control input port.

18. The integrated circuit of claim 16 wherein the input port comprises a data input port.

19. The integrated circuit of claim 16 wherein the current is transmitted in reference to a preselected reference voltage.

20. The integrated circuit of claim 16 and further comprising a transimpedance amplifier coupled to the field effect transistor to convert the current to a voltage.

* * * * *

UNITED STATES PATENT AND TRADEMARK OFFICE
CERTIFICATE OF CORRECTION

| | |
|---|---|
| PATENT NO. | : 6,418,110 B1 |
| APPLICATION NO. | : 09/703315 |
| DATED | : July 9, 2002 |
| INVENTOR(S) | : Rex Baird |

Page 1 of 1

It is certified that error appears in the above-identified patent and that said Letters Patent is hereby corrected as shown below:

At column 5, lines 27-28, delete "08/956,567" and insert -- 08/956,569 --.

Signed and Sealed this

Twenty-first Day of July, 2009

JOHN DOLL
*Acting Director of the United States Patent and Trademark Office*